United States Patent
Torii et al.

(10) Patent No.: US 12,109,981 B2
(45) Date of Patent: Oct. 8, 2024

(54) VEHICLE-MOUNTED SENSOR CLEANING DEVICE AND VEHICLE-MOUNTED SENSOR CLEANING SYSTEM

(71) Applicant: DENSO CORPORATION, Kariya (JP)

(72) Inventors: Soya Torii, Kariya (JP); Kento Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 459 days.

(21) Appl. No.: 17/604,539

(22) PCT Filed: Apr. 6, 2020

(86) PCT No.: PCT/JP2020/015583
§ 371 (c)(1),
(2) Date: Oct. 18, 2021

(87) PCT Pub. No.: WO2021/019840
PCT Pub. Date: Feb. 4, 2021

(65) Prior Publication Data
US 2022/0203936 A1  Jun. 30, 2022

(30) Foreign Application Priority Data
Jul. 31, 2019  (JP) .................. 2019-141287

(51) Int. Cl.
*B60S 1/08*  (2006.01)
*B60S 1/54*  (2006.01)
*B60S 1/60*  (2006.01)

(52) U.S. Cl.
CPC .............. *B60S 1/0807* (2013.01); *B60S 1/54* (2013.01); *B60S 1/60* (2013.01)

(58) Field of Classification Search
CPC .. B60S 1/482; B60S 1/56; B60S 1/485; B60S 1/566; B60S 1/481; B60S 1/52; B60S 1/46; B60S 1/54; B60S 1/0848; B60S 1/0822; B60S 1/483; B60S 1/3415; B60S 1/3409; B60S 1/0859; B60S 1/0411; B60S 1/0833; B60S 1/02; B60S 1/0452; B60S 1/0475;
(Continued)

(56) References Cited

U.S. PATENT DOCUMENTS 11,034,336 B2 * 6/2021 Frederick ................ B60S 1/522
11,305,741 B2 * 4/2022 Frederick ................ B60S 1/522
(Continued)

FOREIGN PATENT DOCUMENTS

JP  H09-169257 A  6/1997
JP  H11-211821 A  8/1999
(Continued)

OTHER PUBLICATIONS

Jun. 30, 2020 International Search Report issued in International Patent Application No. PCT/JP2020/015583.

*Primary Examiner* — Antony M Paul
(74) *Attorney, Agent, or Firm* — Oliff PLC

(57) ABSTRACT

A vehicle-mounted sensor cleaning device includes first and second air jetting devices configured to remove adhered material (such as raindrops and mist particles) that has adhered to detector faces of sensors configured to detect information regarding surroundings of a vehicle, and a control ECU configured to operate air pumps of the first and second air jetting devices when a wiper device of the vehicle has been actuated.

14 Claims, 10 Drawing Sheets

(58) Field of Classification Search
CPC . B60S 1/10; B60R 1/0602; B60R 2001/1223; B60R 1/06
See application file for complete search history.

(56) References Cited

U.S. PATENT DOCUMENTS

| | | | |
|---|---|---|---|
| 2015/0143655 A1* | 5/2015 | Caillot | B60S 1/524 15/250.04 |
| 2018/0170319 A1* | 6/2018 | Schmidt | B60S 1/485 |
| 2019/0009752 A1* | 1/2019 | Rice | B60S 1/56 |
| 2019/0100168 A1* | 4/2019 | Krishnan | B60S 1/0818 |

FOREIGN PATENT DOCUMENTS

| | | |
|---|---|---|
| JP | 2008-265727 A | 11/2008 |
| JP | 2014-068328 A | 4/2014 |
| JP | 2018-047878 A | 3/2018 |

* cited by examiner

VEHICLE-MOUNTED SENSOR CLEANING DEVICE AND VEHICLE-MOUNTED SENSOR CLEANING SYSTEM

CROSS-REFERENCE TO RELATED APPLICATION

The present application is based on and incorporates Japanese Patent Application 2019-141287 filed on Jul. 31, 2019.

TECHNICAL FIELD

The present disclosure relates to a vehicle-mounted sensor cleaning device for cleaning a vehicle-mounted sensor, and to a vehicle-mounted sensor cleaning system including this vehicle-mounted sensor cleaning device.

BACKGROUND ART

In a vehicle rear monitoring device disclosed in Patent Document 1, an actual vehicle image captured by a camera installed at the rear of the vehicle is compared against a pre-stored reference image to detect for the presence of changes in the images in order to determine whether or not adhered material is present on the camera. In a case in which adhered material is determined to be present, an adhered material removal device such as a wiper is actuated in order to remove the adhered material.

In a camera adhered material detection device disclosed in Patent Document 2, image data captured by a camera that faces outward from a vehicle in order to image the vehicle surroundings is compared against image data pre-stored in an image storage section to detect for the presence of changes in the images in order to determine whether or not adhered material is present on the camera. In a case in which adhered material is determined to be present, air is jetted onto the camera in an attempt to remove the adhered material.

PATENT DOCUMENTS

Patent Document 1: Japanese Patent Application Laid-Open (JP-A) No. 2008-265727
Patent Document 2: JP-A No. 2014-68328

SUMMARY OF INVENTION

The related art described above involves complex configurations due to the need for a control device to perform image analysis on imaging data from an image sensor of a vehicle-mounted camera.

An object of the present disclosure is to provide a vehicle-mounted sensor cleaning device and a vehicle-mounted sensor cleaning system with a simple configuration.

A vehicle-mounted sensor cleaning device of a first aspect of the present disclosure includes an adhered material removal section configured to remove material that has adhered to a detector face of a vehicle-mounted sensor configured to detect information regarding a vehicle periphery, and a control section configured to actuate the adhered material removal section when a wiper device of the vehicle has been actuated.

According to the vehicle-mounted sensor cleaning device of the first aspect, the adhered material removal section removes material that has adhered to the detector face of the vehicle-mounted sensor that detects information regarding the vehicle periphery. The adhered material removal section is actuated by the control section when the wiper device of the vehicle has been actuated. Namely, in a case in which the wiper device has been actuated, the control section determines that there is a high likelihood of adhered material such as raindrops and mist particles also adhering to the detector face of the vehicle-mounted sensor, and therefore actuates the adhered material removal section. This approach enables a simpler configuration than configurations in which the presence of adhered material is determined by image analysis of imaging data from an image sensor.

A vehicle-mounted sensor cleaning device of a second aspect of the present disclosure is the first aspect, wherein the control section actuates the adhered material removal section intermittently in a case in which the wiper device has been actuated in either of a continuous wiping mode or an intermittent wiping mode.

According to the vehicle-mounted sensor cleaning device of the second aspect, the control section actuates the adhered material removal section intermittently (intermittent actuation) in a case in which the wiper device has been actuated in either of the continuous wiping mode or the intermittent wiping mode. This enables power consumption to be suppressed compared for example to cases in which the adhered material removal section is actuated continuously.

A vehicle-mounted sensor cleaning device of a third aspect of the present disclosure is the second aspect, wherein the control section actuates the adhered material removal section intermittently on a cycle fitted to match a wiping cycle of the mode in which the wiper device has been actuated.

According to the vehicle-mounted sensor cleaning device of the third aspect, the control section actuates the adhered material removal section intermittently on a cycle fitted to match a wiping cycle of the mode in which the wiper device has been actuated in either mode out of the continuous wiping mode or the intermittent wiping mode. This enables the timings of actuation noise of the adhered material removal section and the wiper device to be aligned, with the result that occupants of the vehicle are less liable to be perturbed by the actuation noise of the adhered material removal section.

A vehicle-mounted sensor cleaning device of a fourth aspect of the present disclosure is the second aspect, wherein the wiper device has a changeable wiping cycle setting in the intermittent wiping mode, and the control section is configured to change a cycle setting of the intermittent actuation independently of the wiping cycle of the intermittent wiping mode.

According to the vehicle-mounted sensor cleaning device of the fourth aspect, the control section is configured to change (able to adjust) a cycle setting of the intermittent actuation of the adhered material removal section independently of the wiping cycle of the intermittent wiping mode of the wiper device. This enables the intermittent actuation cycle setting of the adhered material removal section to be changed as desired, for example in response to the frequency with which raindrops and so on are adhering to the detector face of the vehicle-mounted sensor.

A vehicle-mounted sensor cleaning device of a fifth aspect of the present disclosure is the third aspect, wherein in a case in which the corresponding mode is the continuous wiping mode, the control section varies a resting time period of the intermittent actuation according to whether the continuous wiping mode is in a high-speed wiping mode or in a low-speed wiping mode.

According to the vehicle-mounted sensor cleaning device of the fifth aspect, in a case in which the wiper device has been actuated in the continuous wiping mode, the control section actuates the adhered material removal section intermittently at a cycle with a basis in the wiping cycle of the continuous wiping mode. When this is performed, the control section varies the resting time period of the intermittent actuation of the adhered material removal section according to whether the continuous wiping mode is in the high-speed wiping mode or in the low-speed wiping mode. This enables simple control of the intermittent actuation cycle of the adhered material removal section based on the respective wiping cycles of the high-speed wiping mode and the low-speed wiping mode, taking into account the differing likelihoods of adhered material adhering to the detector face of the vehicle-mounted sensor depending on whether the wiper device has been actuated in the high-speed wiping mode or in the low-speed wiping mode.

A vehicle-mounted sensor cleaning device of a sixth aspect of the present disclosure is any one of the second aspect to the fifth aspect, wherein in the intermittent actuation an actuation time period is shorter than a resting time period.

According to the vehicle-mounted sensor cleaning device of the sixth aspect, in a case in which the control section actuates the adhered material removal section intermittently, the actuation time period is shorter than the resting time period. This for example enables power consumption and actuation noise to be suppressed in comparison to cases in which the actuation time period is set longer than the resting time period.

A vehicle-mounted sensor cleaning device of a seventh aspect of the present disclosure is any one of the first aspect to the sixth aspect, wherein in a case in which the wiper device has been actuated in a mist feature mode, the control section actuates the adhered material removal section for a fixed time period each time a wiper of the wiper device performs a single reciprocal wiping action.

According to the vehicle-mounted sensor cleaning device of the seventh aspect, in a case in which for example mist has developed in the surroundings of the vehicle and the wiper device has been actuated in the mist feature mode, the control section actuates the adhered material removal section for the fixed time period each time the wiper of the wiper device performs a single reciprocal wiping action. This enables mist particles that have adhered to the detector face of the vehicle-mounted sensor to be removed.

A vehicle-mounted sensor cleaning device of an eighth aspect of the present disclosure is the first aspect, wherein the control section actuates the adhered material removal section for a fixed time period either each time a wiper of the wiper device performs a single reciprocal wiping action, or each time the wiper performs reciprocal wiping action an integer multiple of two or more times.

According to the vehicle-mounted sensor cleaning device of the eighth aspect, when the wiper device has been actuated, the control section actuates the adhered material removal section for a fixed time period either each time the wiper of the wiper device performs a single reciprocal wiping action, or each time the wiper performs wiping action an integer multiple of two or more times. Namely, since actuation of the adhered material removal section is executed based on the number of wiping actions performed by the wiper, it is sufficient to actuate the adhered material removal section in response to the wiping actions of the wiper, thereby simplifying control by the control section.

A vehicle-mounted sensor cleaning device of a ninth aspect of the present disclosure is any one of the first aspect to the eighth aspect, wherein the adhered material removal section is an air jetting device configured to jet air toward the detector face of the vehicle-mounted sensor.

According to the vehicle-mounted sensor cleaning device of the ninth aspect, when the wiper device of the vehicle has been actuated, the control section actuates the air jetting device so as to jet air toward the detector face of the vehicle-mounted sensor. This enables adhered material such as raindrops that has adhered to the detector face of the vehicle-mounted sensor to be blown off using air, which can be sourced in sufficient amounts from the atmosphere without needing to be held in a tank or the like.

A vehicle-mounted sensor cleaning device of a tenth aspect of the present disclosure is the fourth aspect, wherein in a case in which the wiper device has been actuated in the intermittent wiping mode and the adhered material removal section is being actuated intermittently, the control section is configured to employ a fixed time period as an actuation time period of the adhered material removal section and to employ a variable time period as a resting time period of the adhered material removal section.

In the vehicle-mounted sensor cleaning device of the tenth aspect, in a case in which the wiper device has been actuated in the intermittent wiping mode and the control section is actuating the adhered material removal section intermittently, a fixed time period is employed as the actuation time period of the adhered material removal section and a variable time period is employed as the resting time period of the adhered material removal section. This enables simple control of the intermittent actuation cycle of the adhered material removal section.

A vehicle-mounted sensor cleaning device of an eleventh aspect of the present disclosure is the seventh aspect, wherein in a case in which the wiper device has been actuated in the mist feature mode, the control section actuates the adhered material removal section for the fixed time period concurrently with actuation of a wiper motor of the wiper device.

In the vehicle-mounted sensor cleaning device of the eleventh aspect, in a case in which the wiper device has been actuated in the mist feature mode, the control section actuates the adhered material removal section for the fixed time period concurrently with actuation of the wiper motor of the wiper device. This enables simple control by the control section.

A vehicle-mounted sensor cleaning device of a twelfth aspect of the present disclosure is the eighth aspect, wherein the control section actuates the adhered material removal section for a fixed time period in a case in which an outbound action or an inbound action of a wiper of the wiper device is being performed.

In the vehicle-mounted sensor cleaning device of the twelfth aspect, the control section actuates the adhered material removal section for the fixed time period in a case in which the outbound action or the inbound action of the wiper of the wiper device is being performed. This enables simple control by the control section.

A vehicle-mounted sensor cleaning system of a thirteenth aspect of the present disclosure includes a wiper device configured to wipe a wiping surface of a vehicle for which peripheral information is detected by a vehicle-mounted sensor, and the vehicle-mounted sensor cleaning device of any one of the first aspect to the twelfth aspect, wherein the control section actuates the adhered material removal section in a case in which the wiper device has been actuated.

In the vehicle-mounted sensor cleaning system of the thirteenth aspect, the wiper device wipes the wiping surface of the vehicle, for which peripheral information is detected by the vehicle-mounted sensor. The control section of the vehicle-mounted sensor cleaning device actuates the adhered material removal section in a case in which the wiper device has been actuated. Since this vehicle-mounted sensor cleaning device is that of any one of the first aspect to the twelfth aspect, the operation and advantageous effects described above can be obtained.

BRIEF DESCRIPTION OF DRAWINGS

The aforementioned object of the present disclosure as well as other objectives, features, and advantages are clarified in the detailed description below, with reference to the attached drawings as follows.

BEST MODE FOR CARRYING OUT THE INVENTION

First Exemplary Embodiment

Explanation follows regarding a vehicle-mounted sensor cleaning device 11 and a vehicle-mounted sensor cleaning system 10 according to a first exemplary embodiment of the present disclosure, with reference to FIG. 1 to FIG. 7B.

Configuration

Figure 1:
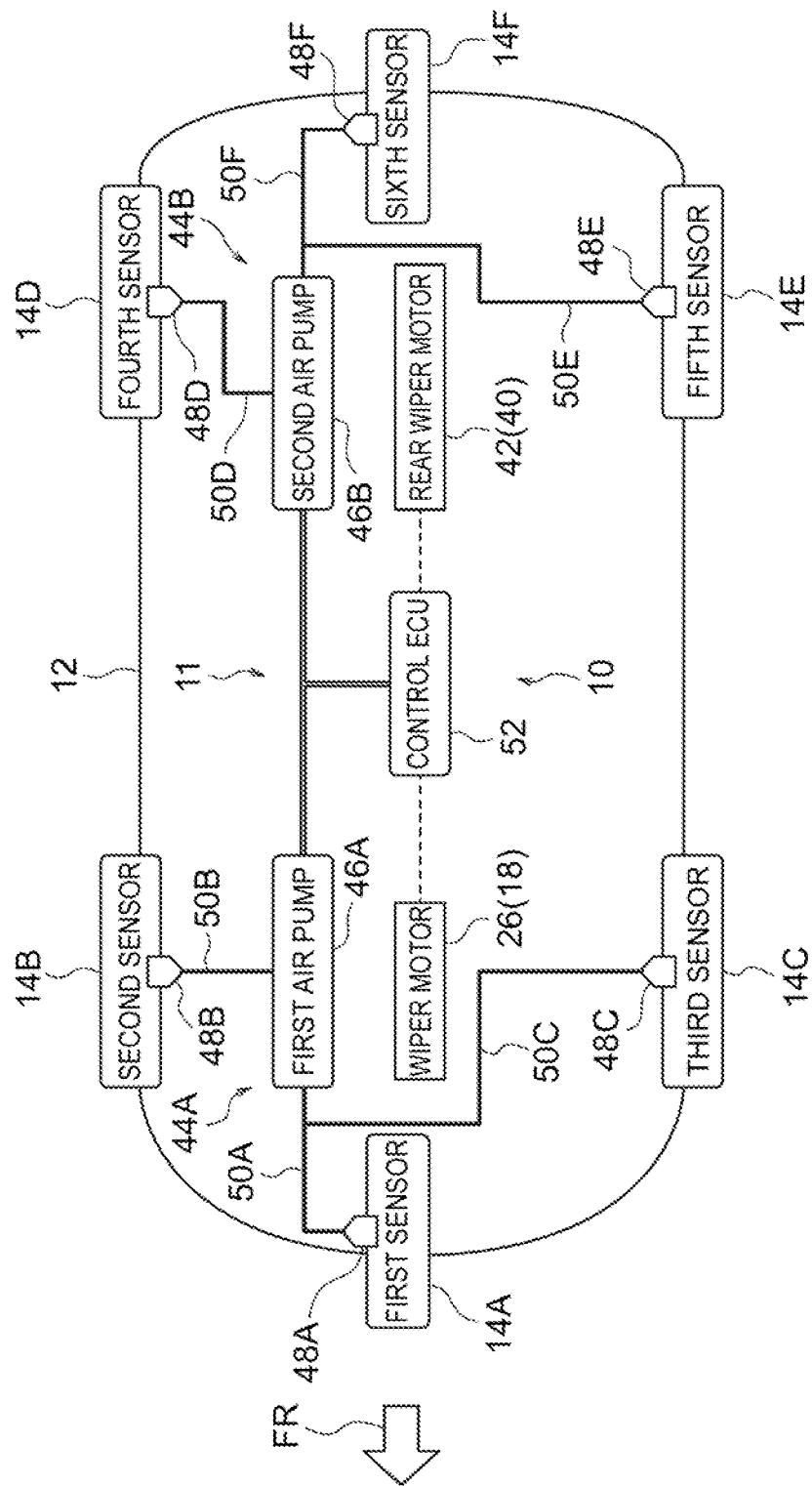
FIG. 1 is a configuration diagram illustrating a schematic configuration of a vehicle-mounted sensor cleaning system according to a first exemplary embodiment of the present disclosure.

As illustrated in FIG. 1, the vehicle-mounted sensor cleaning system 10 according to the present exemplary embodiment includes a wiper device 18, a rear wiper device 40, and the vehicle-mounted sensor cleaning device 11. The vehicle-mounted sensor cleaning device 11 is configured by first and second air jetting devices 44A, 44B serving as adhered material removal sections, and a control ECU 52 serving as a control section. As an example, a vehicle 12 installed with the vehicle-mounted sensor cleaning system 10 is either a self-driving vehicle installed with a self-driving control system, or a vehicle installed with a driving assistance system. The vehicle 12 includes first to sixth sensors 14A, 14B, 14C, 14D, 14E, and 14F configuring plural vehicle-mounted sensors. Note that the arrow FR in FIG. 1 indicates a forward direction relative to the vehicle 12.

Figure 2:
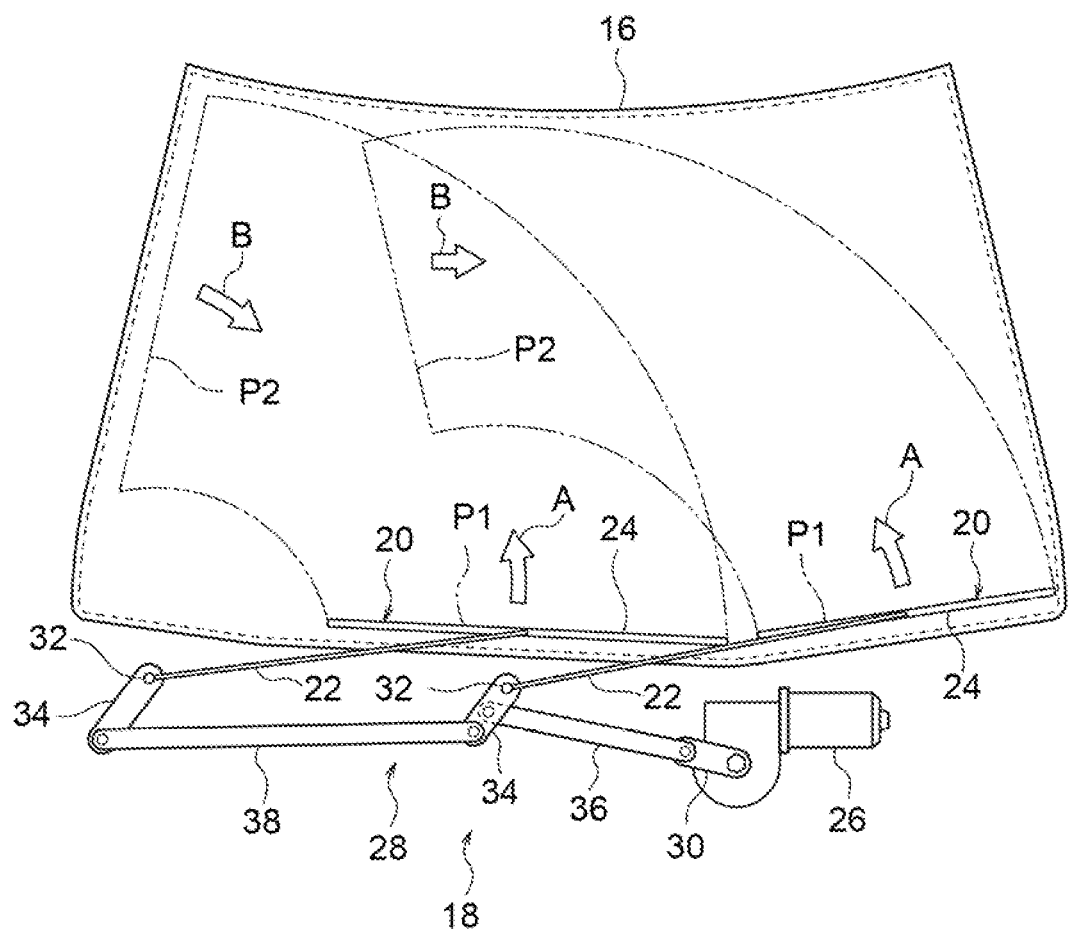
FIG. 2 is a front view illustrating a configuration of a wiper device of the vehicle-mounted sensor cleaning system, and its surroundings.

As illustrated in FIG. 2, the wiper device 18 is a front wiper device for wiping a front windshield 16 of the vehicle 12, and corresponds to a "wiper device" of the present disclosure. As an example, the wiper device 18 includes a left and right pair of wipers 20, a wiper motor (front wiper motor) 26, and a link mechanism 28. The left and right wipers 20 are configured by a left and right pair of wiper arms 22, and a left and right pair of wiper blades 24 respectively coupled to leading ends of the left and right wiper arms 22.

As an example, the wiper motor 26 is a wiper motor that causes an output shaft to rotate one way about its axis. One end of a crank arm 30, this being a configuration member of the link mechanism 28, is fixed to the output shaft of the wiper motor 26. The link mechanism 28 includes a left and right pair of pivot shafts 32 to which base ends of the left and right wiper arms 22 are respectively fixed, a left and right pair of pivot levers 34 to which one ends of the left and right pivot shafts 32 are respectively fixed, a first link rod 36 that spans between one of the pivot levers 34 and the crank arm 30, and a second link rod 38 that spans between other ends of the left and right pivot levers 34.

In this wiper device 18, when the crank arm 30 is rotated one way about the axis of the output shaft integrally with the output shaft of the wiper motor 26, rotation drive force is transmitted from the crank arm 30 to the one pivot lever 34 through the first link rod 36. Rotation drive force is then transmitted from this pivot lever 34 to the other pivot lever 34 through the second link rod 38, thus causing the left and right pivot levers 34 to rotate to-and-fro about the axes of the left and right pivot shafts 32 integrally with the left and right pivot shafts 32. The left and right wipers 20 thereby swing to-and-fro in unison over the front windshield 16 while traveling in the same direction as each other, such that the left and right wiper blades 24 wipe the front windshield 16. When this occurs, the left and right wiper blades 24 respectively move to-and-fro between a lower return position (first return position) P1 and an upper return position (second return position) P2, illustrated in FIG. 2.

In the following explanation, a wiping action of the respective wiper blades 24 (respective wipers 20) from the lower return position P1 to the upper return position P2 (see the arrow A in FIG. 2) is referred to as an outbound action, and a wiping action of the respective wiper blades 24 (respective wipers 20) from the upper return position P2 to the lower return position P1 (see the arrow B in FIG. 2) is referred to as an inbound action. Note that the wiper device 18 may include a left and right pair of wiper motors. In such cases, the left and right wiper motors are both configured by a wiper motor with an output shaft that rotates to-and-fro about its axis, and the base ends of the respective wiper arms 22 are fixed to the output shafts of these wiper motors.

The rear wiper device 40 (only illustrated in FIG. 1) is a wiper device for wiping a non-illustrated rear windshield of the vehicle 12, and includes a rear wiper motor 42 and a non-illustrated rear wiper. As an example, the rear wiper motor 42 is a wiper motor that causes a non-illustrated output shaft to rotate to-and-fro about its axis. The rear wiper is configured by a wiper arm and a wiper blade coupled to a leading end of the wiper arm. A base end of the wiper arm is fixed to the output shaft of the rear wiper motor 42. The rear wiper is swung to-and-fro over the rear windshield by the to-and-fro rotation of the output shaft, such that the wiper blade of the rear wiper wipes the rear windshield.

The first to sixth sensors 14A, 14B, 14C, 14D, 14E, and 14F (hereafter also referred to as "the respective sensors 14" or simply "the sensors 14") are sensors used to detect information regarding the surroundings the vehicle 12, and are configuration elements of the non-illustrated self-driving control system installed in the vehicle 12. The first sensor 14A is installed to a front end section of the vehicle 12, the second sensor 14B and the third sensor 14C are installed to left and right ends of a front section of the vehicle 12, the fourth sensor 14D and the fifth sensor 14E are installed to left and right ends of a rear section of the vehicle 12, and the sixth sensor 14F is installed to a rear end section of the vehicle 12. These sensors 14 may be configured by image sensors (cameras), radar, or laser imaging detection and ranging (LIDAR). Each of the sensors 14 includes a detector face that is either disposed at the vehicle exterior or exposed to the vehicle exterior. In the self-driving control system, a self-driving control ECU that controls self-driving of the vehicle 12 detects the situation in the surroundings of the vehicle 12 based on output of the respective sensors 14.

Note that in a case in which the sensors 14 are configured by image sensors, a surface of each sensor 14 at the vehicle exterior to which light is incident configures the detector face of the sensor 14. In a case in which the sensors 14 are configured by radar, for example millimeter-wave radar or laser radar, or are configured by LIDAR, a surface of each sensor 14 through which millimeter waves, laser, or electromagnetic waves are emitted and are incident configures the detector face of the sensor 14.

The first air jetting device 44A includes a first air pump 46A, first to third air nozzles 48A, 48B, 48C, and first to third air tubes 50A, 50B, 50C that connect the air nozzles 48A, 48B, 48C to the first air pump 46A. The second air jetting device 44B includes a second air pump 46B, fourth to sixth air nozzles 48D, 48E, 48F, and fourth to sixth air tubes 50D, 50E, 50F that connect the air nozzles 48D, 48E, 48F to the second air pump 46B.

The first to sixth air nozzles 48A, 48B, 48C, 48D, 48E, 48F (hereafter sometimes referred to as "the respective air nozzles 48" or simply "the air nozzles 48") include jet outlets disposed close to the first to sixth sensors 14 and facing the detector faces of the respective sensors 14. When the first and second air pumps 46A, 46B (hereafter sometimes referred to as "the respective air pumps 46" or simply "the air pumps 46") are actuated, air is jetted from the respective air nozzles 48 toward the detector faces of the respective sensors 14. This jetted air removes (blows away) any adhered material such as raindrops or mist particles that have adhered to the detector faces of the respective sensors 14, or suppresses such adhesion.

Figure 3:
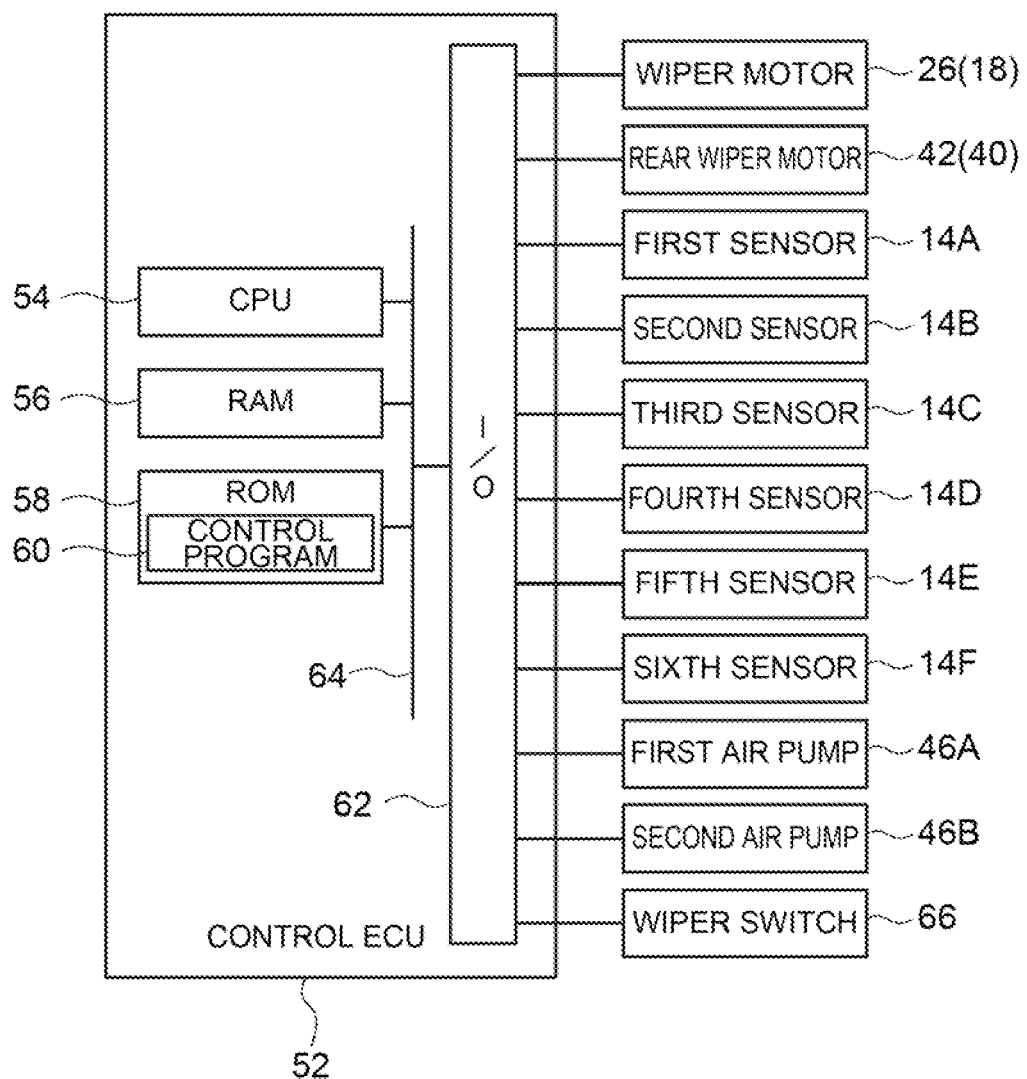
FIG. 3 is a block diagram illustrating a control system of the vehicle-mounted sensor cleaning system.

As illustrated in FIG. 3, the control ECU 52 includes a central processing unit (CPU: processor) 54, random access memory (RAM) 56, read only memory (ROM) 58, and an input/output interface (I/O) 62 that performs communication with external devices. These elements are connected so as to be capable of communicating with each other through a bus 64.

The CPU 54 is a central processing unit that executes various programs and controls various sections. Namely, the CPU 54 reads a control program 60 from the ROM 58, and executes the control program 60 using the RAM 56 as a workspace. The CPU 54 controls the various configuration elements and performs various computation processing according to the control program 60 recorded in the ROM 58.

The wiper motor 26, the rear wiper motor 42, the respective sensors 14, and the respective air pumps 46 are electrically connected to the input/output interface 62. A wiper switch 66 is also electrically connected to the input/output interface 62. Note that the respective air pumps 46 are connected to the input/output interface 62 over a controller area network (CAN; see FIG. 1).

The wiper switch 66 is an ON/OFF switch for power supply from a non-illustrated battery installed in the vehicle 12 to the wiper motor 26 and the rear wiper motor 42. The wiper switch 66 can also be switched between a mist feature mode selection position for actuating the wiper device 18 in a mist feature mode (MIST), an intermittent wiping mode selection position for actuating the wiper device 18 in an intermittent wiping mode (INT), a low-speed wiping mode selection position for actuating the wiper device 18 in a low-speed wiping mode (LOW), a high-speed wiping mode selection position for actuating the wiper device 18 in a high-speed wiping mode (HIGH), and a stop selection position to stop actuation of the wiper device 18. Switching between the selection positions of the respective modes is achieved here by a driver switching as desired. Switching between the respective modes may also be performed based on commands from the control ECU 52 in response to input of a signal from a non-illustrated raindrop sensor installed to the vehicle. The wiper switch 66 is also provided with a rear wiper actuation section for actuating the rear wiper device 40.

The mist feature mode is only engaged for as long as the driver applies operation force to place the wiper switch 66 at the mist feature mode selection position, and is switched off when this operation force is released. When the mist feature mode is engaged, the control ECU 52 temporarily actuates the wiper motor 26 such that wipers 20 perform a single reciprocal wiping action or two reciprocal wiping actions (a single reciprocal wiping action in the present exemplary embodiment).

The intermittent wiping mode is a mode in which the wiper device 18 is actuated intermittently. When the intermittent wiping mode is engaged, the control ECU 52 actuates the wiper motor 26 intermittently at predetermined time intervals (with a predetermined resting time period), such that the wipers 20 perform to-and-fro wiping actions intermittently. When in the intermittent wiping mode, the driver is able to change (adjust) a wiping cycle (intermittency duration) setting by operating a wiping cycle adjuster (such as a dial) provided to the wiper switch 66.

The low-speed wiping mode and the high-speed wiping mode are continuous wiping modes in which the wiper device 18 is actuated continuously. Specifically, when the low-speed wiping mode is engaged, the control ECU 52 causes the wiper motor 26 to rotate continuously at a low speed, such that wipers 20 perform continuous to-and-fro wiping actions at a low speed. When the high-speed wiping mode is engaged, the control ECU 52 causes the wiper motor 26 to rotate continuously at a high speed, such that wipers 20 perform continuous to-and-fro wiping actions at a high speed.

When the wiper device 18 has been actuated in any mode out of the above modes, the control ECU 52 also actuates the first and second air pumps 46A, 46B. Specifically, in a case in which the wiper device 18 has been actuated in the mist feature mode, the control ECU 52 actuates the respective air pumps 46 for a fixed time period each time the wipers 20 of the wiper device 18 perform a single to-and-fro wiping action.

In a case in which the wiper device 18 has been actuated in any mode out of the intermittent wiping mode, the low-speed wiping mode, or the high-speed wiping mode, the control ECU 52 actuates the respective air pumps 46 intermittently. An actuation time period is set shorter than a resting time period of this intermittent actuation. Moreover, whereas the actuation time period of the intermittent actuation of the respective air pumps 46 is the same whether in the high-speed wiping mode or the low-speed wiping mode, the resting time period differs between the high-speed wiping mode and the low-speed wiping mode (in the present implementation, the resting time period employed when in the low-speed wiping mode is longer than the resting time period employed when in the high-speed wiping mode). Moreover, a cycle of the intermittent actuation of the respective air pumps 46 is set to a cycle fitted to match a wiping cycle of the selected mode, namely the intermittent wiping mode, the low-speed wiping mode, or the high-speed wiping mode. Note that the intermittent actuation cycle of the respective air pumps 46 does not necessarily have to be set to a cycle fitted to match the wiping cycle of the selected mode, and may be a cycle set with a basis in the wiping cycle of the selected mode.

Note that when in the intermittent wiping mode, the control ECU 52 is capable of changing an intermittent actuation cycle setting of the respective air pumps 46 independently of the wiping cycle. Namely, in the present exemplary embodiment, the wiping cycle of the intermittent wiping mode and the intermittent actuation cycle (intermittency duration) of the respective air pumps 46 may be set so as to differ from each other. Specifically, for example, a removal cycle adjuster (such as a dial) for changing (adjusting) the intermittent actuation cycle setting of the respective air pumps 46 is provided to the wiper switch 66, separately to the above-mentioned wiping cycle adjuster. When this removal cycle adjuster is operated, the control ECU 52 changes the intermittent actuation cycle setting of the respective air pumps 46.

Figure 4:
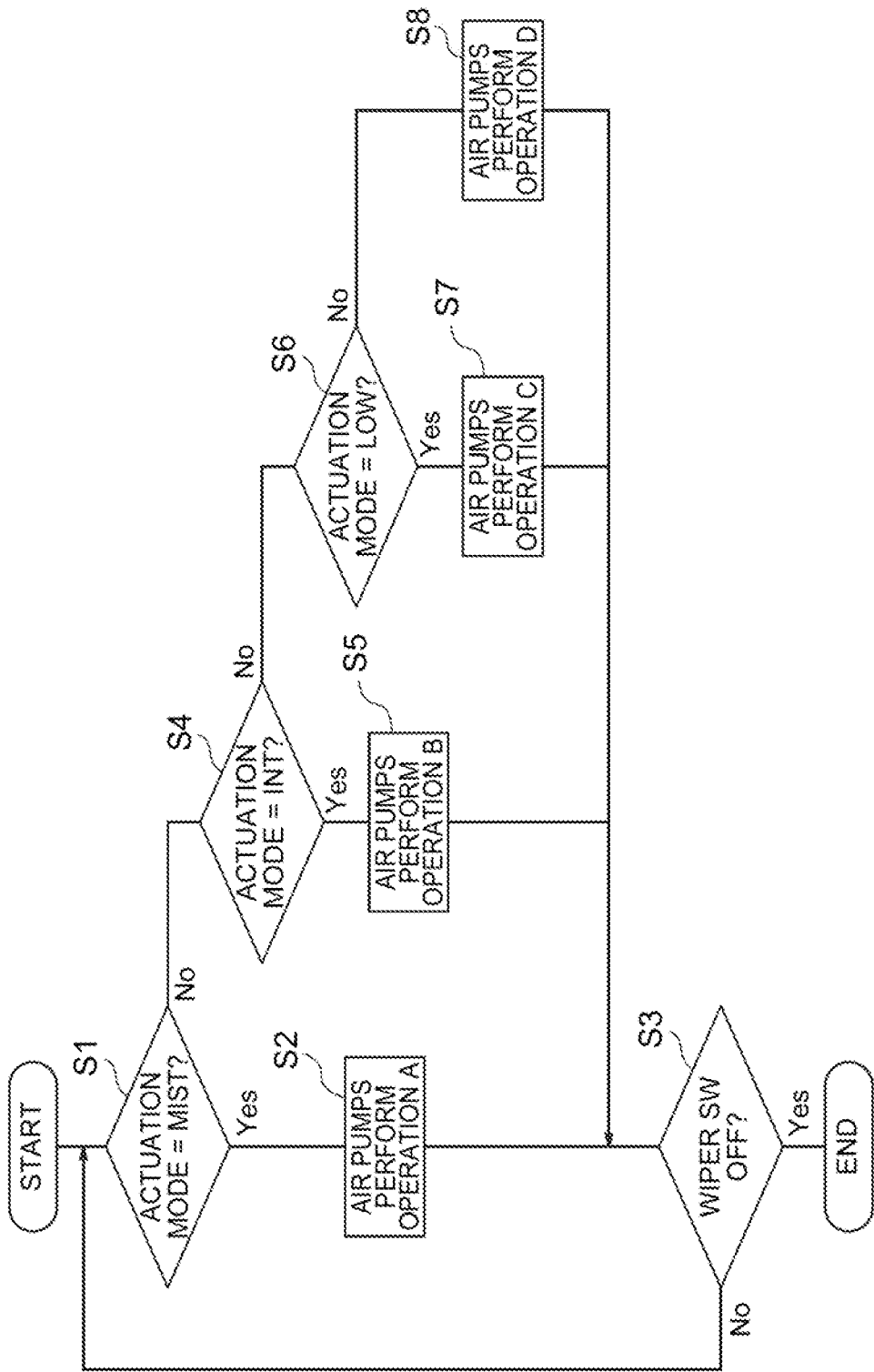
FIG. 4 is a flowchart illustrating a flow of processing executed by a control section of a vehicle-mounted sensor cleaning device of the vehicle-mounted sensor cleaning system.
Figure 5:
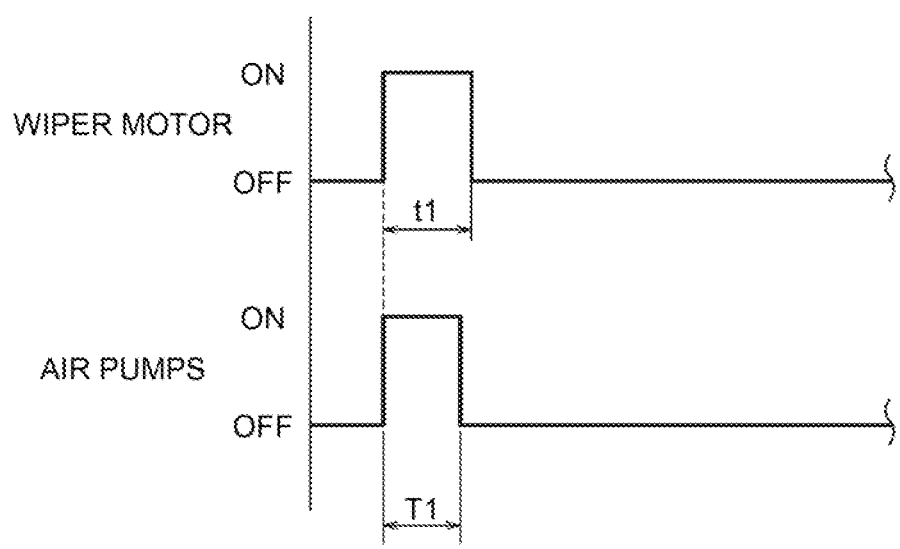
FIG. 5 is a timing chart illustrating an example of wiper motor and air pump actuation timings in a case in which operation A in FIG. 4 is being executed.

Next, explanation follows regarding an example of specific processing executed by the control ECU 52 configured as described above, with reference to the flowchart illustrated in FIG. 4 and the timing charts illustrated in FIG. 5 to FIG. 7B. This processing is started when the wiper switch 66 is moved to either the mist feature mode selection position, the intermittent wiping mode selection position, the low-speed wiping mode selection position, or the high-speed wiping mode selection position. When the processing starts, first, at step S1, the control ECU 52 determines whether or not the mode (actuation mode) selected by moving the wiper switch 66 is the mist feature mode (MIST). Processing transitions to step S2 in a case in which this determination is affirmative, whereas processing transitions to step S4 in a case in which this determination is negative.

When processing has transitioned to step S2, the control ECU 52 causes the respective air pumps 46 to perform an operation A. As illustrated in the example in FIG. 5, in operation A, the air pumps 46 are actuated for a fixed time period T1 concurrently with actuation of the wiper motor 26 to cause the wipers 20 to perform a single to-and-fro wiping action (a mist removal action). The actuation time period T1 of the air pumps 46 in this case is set shorter than an actuation time period t1 of the wiper motor 26. When the processing of step S2 is complete, processing transitions to step S3.

At step S3, the control ECU 52 determines whether or not the wiper switch (wiper SW) 66 has been switched OFF. The processing of the flowchart illustrated in FIG. 4 is ended in a case in which this determination is affirmative, whereas processing returns to step S1 described previously in a case in which this determination is negative.

In a case in which determination is negative at step S1 and processing has transitioned to step S4, the control ECU 52 determines whether or not the actuation mode selected by operation of the wiper switch 66 is the intermittent wiping mode (INT). Processing transitions to step S5 in a case in which this determination is affirmative, whereas processing transitions to step S6 in a case in which this determination is negative.

When processing has transitioned to step S5, the control ECU 52 causes the respective air pumps 46 to perform an operation B. As illustrated in the examples in FIG. 6A to FIG. 6C, in operation B, the air pumps 46 are actuated intermittently. During this intermittent actuation of the air pumps 46 in operation B, the actuation time period of the air pumps 46 is set to the fixed time period T1, whereas the resting time period of the air pumps 46 is variable (as an example, this setting may be changed to any setting out of T4, T4', or T4"). This setting is changed by moving the removal cycle adjuster of the wiper switch 66.

Figure 6A:
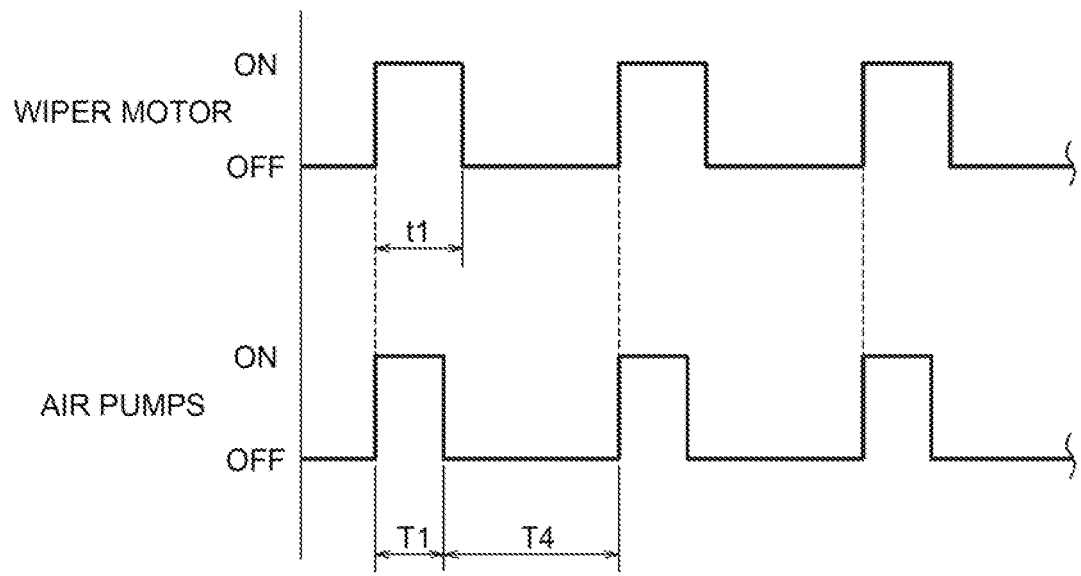
FIG. 6A is a timing chart illustrating a first example of wiper motor and air pump actuation timings in a case in which operation B in FIG. 4 is being executed.
Figure 6B:
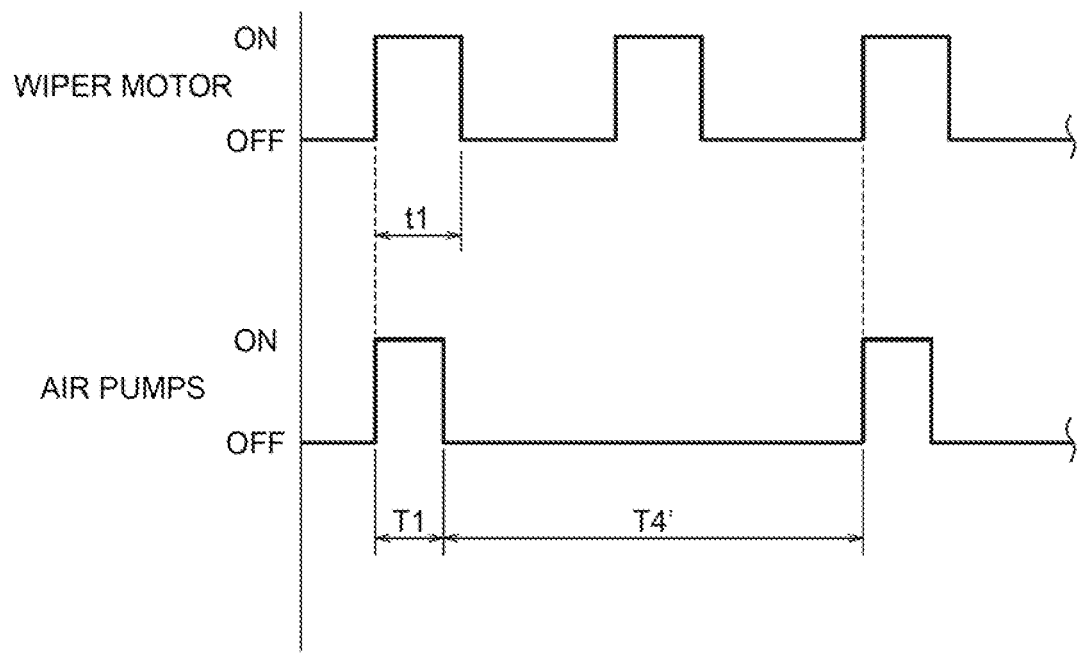
FIG. 6B is a timing chart illustrating a second example of wiper motor and air pump actuation timings in a case in which operation B in FIG. 4 is being executed.
Figure 6C:
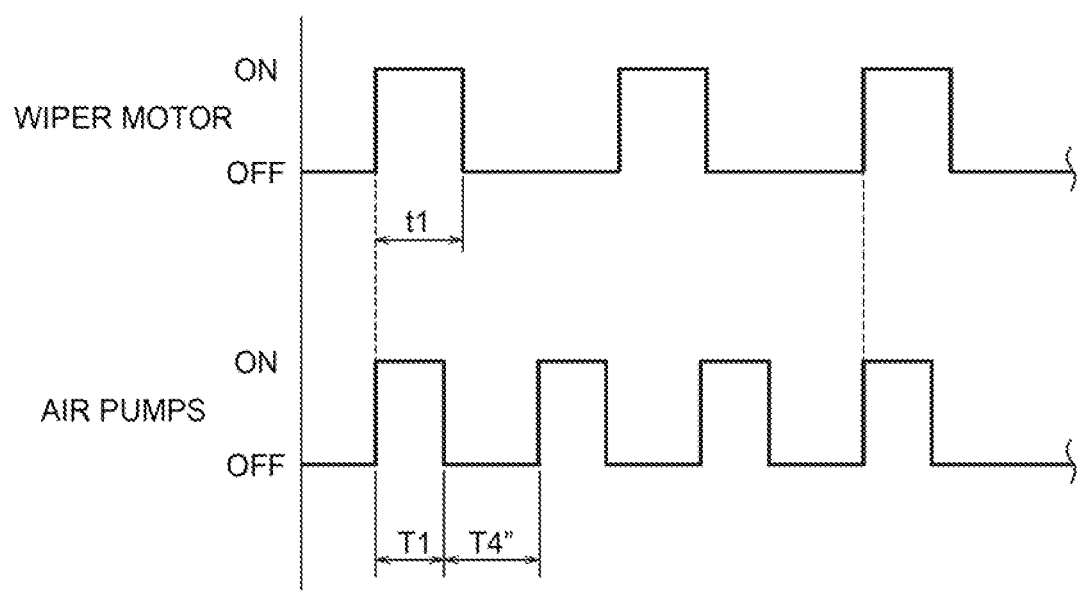
FIG. 6C is a timing chart illustrating a third example of wiper motor and air pump actuation timings in a case in which operation B in FIG. 4 is being executed.

FIG. 6A illustrates an example in which the air pumps 46 perform intermittent actuation that is fitted to match the intermittent actuation of the wiper motor 26. FIG. 6B illustrates an example in which the air pumps 46 perform two actuations for every three actuations of the wiper motor 26. FIG. 6C illustrates an example in which the air pumps 46 perform four actuations for every three actuations of the wiper motor 26. Note that the resting time periods T4, T4', T4" are for example set to between two seconds and twelve seconds. Each of these resting time periods T4, T4', T4" is set longer than the actuation time period T1. When the processing of step S5 is complete, processing transitions to step S3 described previously.

In a case in which determination is negative at step S4 and processing has transitioned to step S6, the control ECU 52 determines whether or not the actuation mode selected by moving the wiper switch 66 is the low-speed wiping mode (LOW). Processing transitions to step S7 in a case in which this determination is affirmative, whereas processing transitions to step S8 in a case in which this determination is negative, namely in a case in which the control ECU 52 determines that the actuation mode selected by moving the wiper switch 66 is the high-speed wiping mode (HIGH).

When processing has transitioned to step S7, namely in a case in which the control ECU 52 has determined that the selected actuation mode is the low-speed wiping mode, the control ECU 52 causes the respective air pumps 46 to perform an operation C. As illustrated in the example in FIG. 7A, in operation C, the air pumps 46 are actuated intermittently at a fixed time interval while the wiper motor 26 is actuated continuously. During this intermittent actuation of the air pumps 46 in operation C, the actuation time period T1 of the air pumps 46 is set shorter than a resting time period T2 of the air pumps 46. When the processing of step S7 is complete, processing transitions to step S3 described previously.

In a case in which the determination of step S6 is negative and processing has transitioned to step S8, namely in a case in which the control ECU 52 has determined that the selected actuation mode is the high-speed wiping mode, the control ECU 52 causes the air pumps 46 to perform an operation D. As illustrated in the example in FIG. 7B, in operation D, the air pumps 46 are actuated intermittently at a fixed time interval while the wiper motor 26 is actuated continuously. During this intermittent actuation of the air pumps 46 in operation D, the actuation time period T1 of the air pumps 46 is set shorter than a resting time period T3 of the air pumps 46. Moreover, this resting time period T3 is set shorter than the resting time period T2 described previously. When the processing of step S8 is complete, processing transitions to step S3 described previously.

Operation and Advantageous Effects

Next, explanation follows regarding operation and advantageous effects of the present exemplary embodiment.

In the present exemplary embodiment, adhered material such as raindrops and mist particles that have adhered to the detector faces of the first to sixth sensors 14A to 14F employed to detect information regarding the surroundings of the vehicle 12 is removed by the first and second air jetting devices 44A, 44B. The respective air pumps 46 of the air jetting devices 44A, 44B are actuated by the control ECU 52 when the wiper device 18 of the vehicle 12 has been actuated. Namely, in a case in which the wiper device 18 has been actuated, the control ECU 52 determines that there is a high likelihood of adhered material such as raindrops and mist particles also adhering to the detector faces of the respective sensors 14, and therefore actuates the respective air pumps 46. This approach enables a simpler configuration than configurations in which the presence of adhered material is determined by image analysis of imaging data from an image sensor. This for example enables a reduction in costs. Moreover, since there is no need to perform image analysis of imaging data, this configuration can also be applied to cleaning of vehicle-mounted sensors other than image sensors, thereby enabling application to a greater range of vehicle-mounted sensor types.

Moreover, in the present exemplary embodiment, in a case in which the wiper device 18 has been actuated in any mode out of the intermittent wiping mode, the low-speed wiping mode, or the high-speed wiping mode, the control ECU 52 actuates the respective air pumps 46 intermittently. This enables power consumption to be suppressed compared for example to cases in which the respective air pumps 46 are actuated continuously.

Figure 7A:
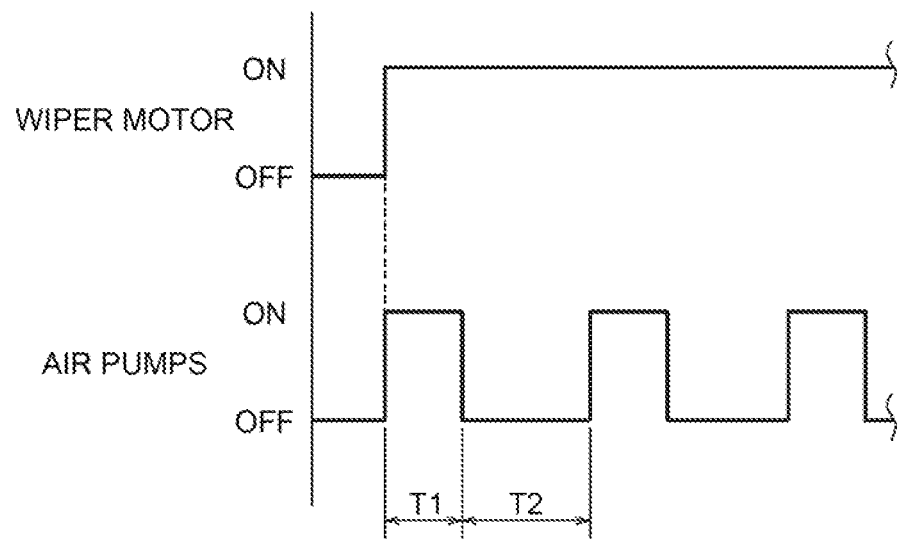
FIG. 7A is a timing chart illustrating an example of wiper motor and air pump actuation timings in a case in which operation C in FIG. 4 is being executed.
Figure 7B:
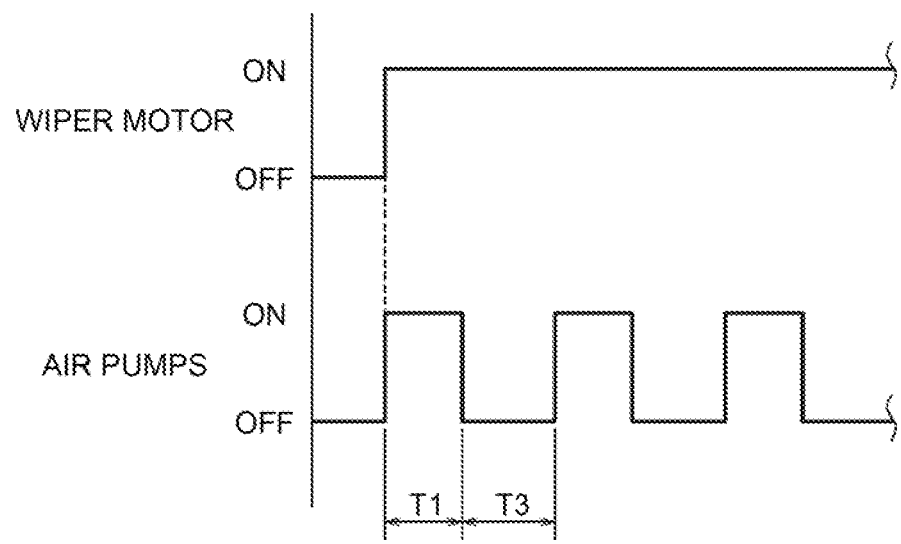
FIG. 7B is a timing chart illustrating an example of wiper motor and air pump actuation timings in a case in which operation D in FIG. 4 is being executed.

Moreover, in the present exemplary embodiment, in a case in which the wiper device 18 has been actuated in a continuous wiping mode (either the low-speed wiping mode or the high-speed wiping mode), the control ECU 52 actuates the respective air pumps 46 intermittently on a cycle that is fitted to match the wiping cycle of the corresponding continuous wiping mode (see FIG. 7A and FIG. 7B). This enables the timings of actuation noise of the wiper motor 26 of the wiper device 18 and actuation noise of the respective air pumps 46 to be aligned, with the result that occupants of the vehicle 12 are less liable to be perturbed by the actuation noise of the respective air pumps 46.

Furthermore, in the present exemplary embodiment, when in the intermittent wiping mode the control ECU 52 is capable of changing the intermittent actuation cycle setting of the respective air pumps 46 independently of the wiping cycle of the wiper device 18 (see FIG. 6A to FIG. 6C). This enables the intermittent actuation cycle setting of the respective air pumps 46 to be changed as desired, for example in response to the frequency with which raindrops and so on are adhering to the detector faces of the respective sensors 14. Moreover, as illustrated in FIG. 6A, the intermittent actuation cycle of the respective air pumps 46 and the wiping cycle can be fitted to match each other in the intermittent wiping mode. This enables the respective timings of actuation noise of the wiper motor 26 and actuation noise of the respective air pumps 46 to be aligned when in the intermittent wiping mode, with the result that occupants of the vehicle 12 are less liable to be perturbed by the actuation noise of the respective air pumps 46 when in the intermittent wiping mode.

Moreover, as described previously, in the present exemplary embodiment, in a case in which the wiper device 18 has been actuated in a continuous wiping mode, the control ECU 52 actuates the respective air pumps 46 intermittently on a cycle that has a basis in the wiping cycle of the corresponding continuous wiping mode. Namely, the control ECU 52 varies the resting time periods of the intermittent actuation of the respective air pumps 46 between the high-speed wiping mode and the low-speed wiping mode, these being continuous wiping modes (see T2 in FIG. 7A and T3 in FIG. 7B). This enables simple control of the intermittent actuation cycle of the respective air pumps 46 based on the respective wiping cycles of the high-speed wiping mode and the low-speed wiping mode, taking into account the differing likelihoods of adhered material adhering to the detector faces of the respective sensors 14 depending on whether the wiper device 18 has been actuated in the high-speed wiping mode or the low-speed wiping mode.

Moreover, in the present exemplary embodiment, in a case in which the control ECU 52 actuates the respective air pumps 46 intermittently, the actuation time period T1 is set shorter than the corresponding resting time period T2, T3, T4, T4', or T4". This for example enables power consumption and actuation noise to be suppressed compared to cases in which the actuation time period is set longer than the resting time period of the respective air pumps 46.

Moreover, in the present exemplary embodiment, in a case in which for example mist has developed in the surroundings of the vehicle 12 and the wiper device 18 has been actuated in the mist feature mode, the control ECU 52 actuates the respective air pumps 46 for the fixed time period T1 each time the wipers 20 of the wiper device 18 perform a single to-and-fro wiping action. This enables mist particles that have adhered to the detector faces of the respective sensors 14 to be removed.

Moreover, in the present exemplary embodiment, when the wiper device 18 of the vehicle 12 has been actuated, the respective air pumps 46 of the air jetting devices 44A, 44B are actuated by the control ECU 52 such that air is jetted toward the detector faces of the respective sensors 14. This enables adhered material such as raindrops that has adhered to the detector faces of the respective sensors 14 to be blown off (removed) using air, which can be sourced in sufficient amounts from the atmosphere without needing to be held in a tank or the like. The air jetting devices 44A, 44B that jet air toward the detector faces of the respective sensors 14 configure adhered material removal sections, thereby eliminating, for example, the need to refill cleaning liquid while also facilitating maintenance in comparison to configurations in which adhered material removal sections are configured by cleaning liquid jetting devices that jet cleaning liquid toward the detector faces of the respective sensors 14.

Second Exemplary Embodiment

Next, explanation follows regarding a second exemplary embodiment of the present disclosure. Note that configuration and operation that are basically the same as those in the first exemplary embodiment are allocated the same reference numerals as in the first exemplary embodiment, and explanation thereof is omitted.

Figure 8:
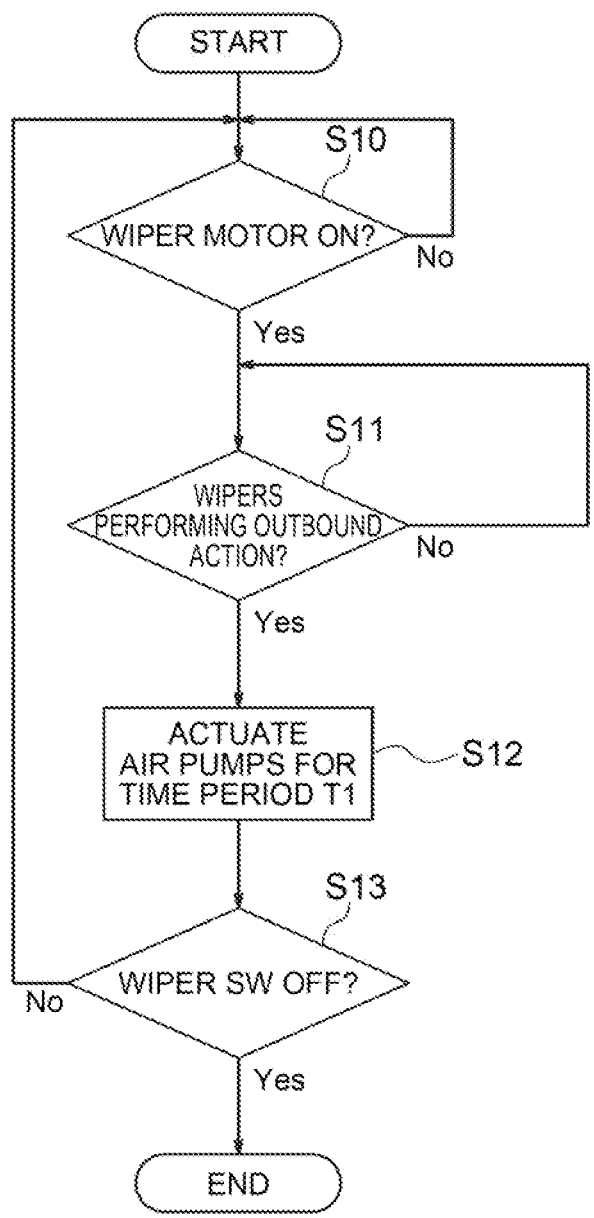
FIG. 8 is a flowchart illustrating a flow of processing executed by a control section of a vehicle-mounted sensor cleaning device of a vehicle-mounted sensor cleaning system according to a second exemplary embodiment of the present disclosure.
Figure 9:
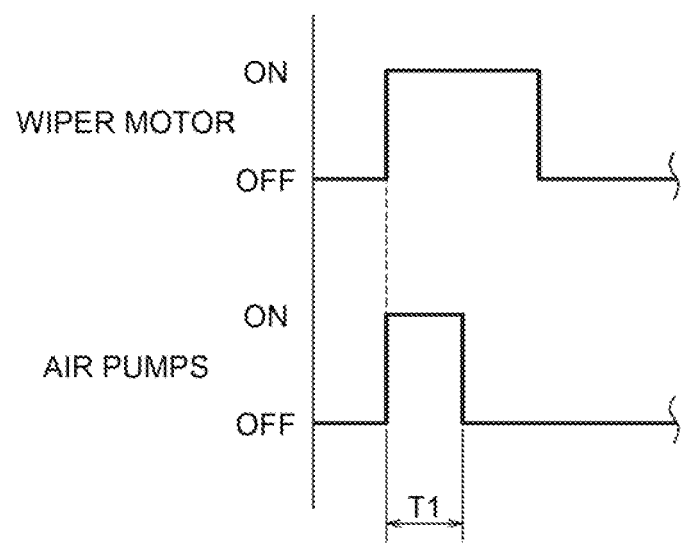
FIG. 9 is a timing chart illustrating an example of wiper motor and air pump actuation timings in the second exemplary embodiment.

FIG. 8 is a flowchart illustrating a flow of processing executed by the control ECU 52 (control section) of a vehicle-mounted sensor cleaning device included in a vehicle-mounted sensor cleaning system according to the second exemplary embodiment of the present disclosure. FIG. 9 is a timing chart illustrating an example of actuation timings of the wiper motor 26 and the air pumps 46 according to the second exemplary embodiment.

Although the present exemplary embodiment has the same basic configuration as the first exemplary embodiment, the processing executed by the control ECU 52 differs from that in the first exemplary embodiment. Moreover, in the present exemplary embodiment the control ECU 52 is capable of detecting swing positions (wiping positions) of the respective wipers 20, and actuates the respective air pumps 46 for a fixed time period each time the wipers 20 start a single to-and-fro wiping action. Specifically, for example, a rotation position detection sensor that detects the rotation position of the output shaft of the wiper motor 26 is electrically connected to the control ECU 52. The control ECU 52 detects the swing positions of the respective wipers 20 based on output from this rotation position detection sensor.

Explanation follows regarding an example of specific processing executed by the control ECU 52, with reference to the flowchart illustrated in FIG. 8 and the timing chart illustrated in FIG. 9. This processing is started when the wiper switch 66 is moved to the mist feature mode selection position, the intermittent wiping mode selection position, the low-speed wiping mode selection position, or the high-speed wiping mode selection position. When the processing starts, first, at step S10, the control ECU 52 determines whether or not the wiper motor 26 has been actuated (i.e. is ON). Processing transitions to step S11 in a case in which this determination is affirmative, whereas the processing of step S10 is repeated in a case in which this determination is negative.

When processing has transitioned to step S11, the control ECU 52 determines whether or not the wipers 20 have started an outbound action (see the arrow A in FIG. 2). Processing transitions to step S12 in a case in which this determination is affirmative, whereas the processing of step S11 is repeated in a case in which this determination is negative.

When processing has transitioned to step S12, the control ECU 52 actuates the respective air pumps 46 for the fixed time period T1. When the processing of step S12 is complete, processing transitions to step S13. At step S13, the control ECU 52 determines whether or not the wiper switch (wiper SW) 66 has been switched OFF. The processing of the flowchart illustrated in FIG. 8 is ended in a case in which this determination is affirmative, whereas processing returns to step S10 described previously in a case in which this determination is negative.

In this exemplary embodiment also, when the wiper device 18 has been actuated, the control ECU 52 determines that there is a high likelihood of adhered material such as raindrops and mist particles adhering to the detector faces of the respective sensors 14, and therefore actuates the respective air pumps 46. Thus, similarly to in the first exemplary embodiment, since there is no need to perform image analysis of imaging data, the configuration is simple and suitable for application to a greater range of vehicle-mounted sensor types. Furthermore, in the present exemplary embodiment, when the wiper device 18 has been actuated the control ECU 52 actuates the respective air pumps 46 for the fixed time period T1 each time the wipers 20 perform a single to-and-fro wiping action. Namely, since the number of single to-and-fro wiping actions of the wipers 20 is the same as the number of times the respective air pumps 46 are actuated, it is sufficient to actuate the respective air pumps 46 in response to each single to-and-fro wiping action of the wipers 20, thereby simplifying control by the control ECU 52.

Supplementary Explanation of Exemplary Embodiments

Although the control ECU 52 actuates the respective air pumps 46 for the fixed time period T1 each time the wipers 20 perform a single to-and-fro wiping action in the second exemplary embodiment, there is no limitation thereto. Namely, the control ECU 52 may actuate the respective air pumps 46 for the fixed time period T1 each time the wipers 20 perform a number of wiping actions that is an integer number (two or more) times the number of single to-and-fro wiping actions. In such cases, this number of to-and-fro actions of the wipers 20 may set so as to differ between the high-speed wiping mode and the low-speed wiping mode (with the result that fewer such wiping actions are required when in the high-speed wiping mode than when in the low-speed wiping mode).

Moreover, although the control ECU 52 determines whether or not the wipers 20 are performing an outbound action at step S11 in the second exemplary embodiment, there is no limitation thereto. Namely, the control ECU 52 may be configured to determine whether or not the wipers 20 are performing an inbound action (see the arrow B in FIG. 2) at step S11.

Although the adhered material removal sections are configured by the air jetting devices 44A, 44B that jet air toward the detector faces of the sensors 14 in the above exemplary embodiments, there is no limitation thereto. The adhered material removal sections may be configured by cleaning liquid jetting devices that jet cleaning liquid toward the detector faces of the sensors 14.

Note that although the above exemplary embodiments have described cases in which the processing performed by the control ECU 52 is software processing implemented by executing the control program 60, there is no limitation thereto, and the processing may be performed by hardware. Alternatively the processing may be performed by a combination of both software and hardware.

Note that the processing executed by the CPU 54 reading and executing software (the control program 60) in the above exemplary embodiments may be executed by various types of processor other than the CPU 54. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing executed by the CPU 54 may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although the control program 60 is in a format pre-stored (installed) in the ROM 58 in the above exemplary embodiments, there is no limitation thereto. A program may be provided in a format recorded on a recording medium such as compact disc read only memory (CD-ROM), digital versatile disc read only memory (DVD-ROM), or universal serial bus (USB) memory. Alternatively, a program may be provided in a format downloadable from an external device through a network.

Moreover, although the present disclosure has been described with reference to exemplary embodiments, it is understood that the present disclosure is not limited by such exemplary embodiments or structures. The present disclosure encompasses various modified examples and other modifications within an equivalent range. Moreover, the range and conceptual scope of the present disclosure also includes implementation in various combinations, as well as other combinations and implementations incorporating some, all, or no elements of such combinations and implementations.

The invention claimed is:

1. A vehicle-mounted sensor cleaning device, comprising:
an adhered material removal section configured to remove material that has adhered to a detector face of a vehicle-mounted sensor configured to detect information regarding a vehicle periphery; and
a controller configured to actuate the adhered material removal section when a wiper device of the vehicle has been actuated, wherein
the controller actuates the adhered material removal section intermittently in a case in which the wiper device has been actuated in either of a continuous wiping mode or an intermittent wiping mode.

2. The vehicle-mounted sensor cleaning device of claim 1, wherein the controller actuates the adhered material removal section intermittently on a cycle fitted to match a wiping cycle of the mode in which the wiper device has been actuated.

3. The vehicle-mounted sensor cleaning device of claim 2, wherein the corresponding in which the wiper device has been actuated is the continuous wiping mode, and the controller varies a resting time period of the intermittent actuation according to whether the continuous wiping mode is in a high-speed wiping mode or in a low-speed wiping mode.

4. The vehicle-mounted sensor cleaning device of claim 1, wherein:
the wiper device has a changeable wiping cycle setting in the intermittent wiping mode; and
the controller is configured to change a cycle setting of the intermittent actuation independently of the wiping cycle of the intermittent wiping mode.

5. The vehicle-mounted sensor cleaning device of claim 4, wherein, in a case in which the wiper device has been actuated in the intermittent wiping mode and the adhered material removal section is being actuated intermittently, the controller is configured to employ a fixed time period as an actuation time period of the adhered material removal section and to employ a variable time period as a resting time period of the adhered material removal section.

6. The vehicle-mounted sensor cleaning device of claim 1, wherein, in the intermittent actuation, an actuation time period is shorter than a resting time period.

7. A vehicle-mounted sensor cleaning system, comprising:
a wiper device configured to wipe a wiping surface of a vehicle for which peripheral information is detected by a vehicle-mounted sensor; and
the vehicle-mounted sensor cleaning device of claim 1, wherein the controller actuates the adhered material removal section in a case in which the wiper device has been actuated.

8. A vehicle-mounted sensor cleaning device, comprising:
an adhered material removal section configured to remove material that has adhered to a detector face of a vehicle-mounted sensor configured to detect information regarding a vehicle periphery; and
a controller configured to actuate the adhered material removal section when a wiper device of the vehicle has been actuated, wherein
the controller actuates the adhered material removal section for a fixed time period either each time a wiper of the wiper device performs a single reciprocal wiping action, or each time the wiper performs the reciprocal wiping action an integer multiple of two or more times.

9. The vehicle-mounted sensor cleaning device of claim 8, wherein, in a case in which the wiper device has been actuated in a mist feature mode, the controller actuates the adhered material removal section for a fixed time period each time a wiper of the wiper device performs a single reciprocal wiping action.

10. The vehicle-mounted sensor cleaning device of claim 9, wherein, in a case in which the wiper device has been actuated in the mist feature mode, the controller actuates the adhered material removal section for the fixed time period concurrently with actuation of a wiper motor of the wiper device.

11. The vehicle-mounted sensor cleaning device of claim 8, wherein the controller actuates the adhered material removal section for the fixed time period in a case in which an outbound action or an inbound action of a wiper of the wiper device is being performed.

12. A vehicle-mounted sensor cleaning system, comprising:
a wiper device configured to wipe a wiping surface of a vehicle for which peripheral information is detected by a vehicle-mounted sensor; and
the vehicle-mounted sensor cleaning device of claim 8, wherein the controller actuates the adhered material removal section in a case in which the wiper device has been actuated.

13. A vehicle-mounted sensor cleaning device, comprising:
an adhered material removal section configured to remove material that has adhered to a detector face of a vehicle-mounted sensor configured to detect information regarding a vehicle periphery; and
a controller configured to actuate the adhered material removal section when a wiper device of the vehicle has been actuated, wherein
the adhered material removal section is an air jetting device configured to jet air toward the detector face of the vehicle-mounted sensor.

14. A vehicle-mounted sensor cleaning system, comprising:
a wiper device configured to wipe a wiping surface of a vehicle for which peripheral information is detected by a vehicle-mounted sensor; and the vehicle-mounted sensor cleaning device of claim 13, wherein the controller actuates the adhered material removal section in a case in which the wiper device has been actuated.

\* \* \* \* \*